Jan. 2, 1940.  R. W. GLASNER ET AL  2,185,551
SAFETY LOCKING MECHANISM FOR PRESSES AND THE LIKE
Filed Oct. 27, 1938  6 Sheets-Sheet 3

Inventors
Rudolph W. Glasner
Einar K. Johansen

Jan. 2, 1940.　　　R. W. GLASNER ET AL　　　2,185,551
SAFETY LOCKING MECHANISM FOR PRESSES AND THE LIKE
Filed Oct. 27, 1938　　　6 Sheets-Sheet 5

Patented Jan. 2, 1940

2,185,551

UNITED STATES PATENT OFFICE 2,185,551

SAFETY LOCKING MECHANISM FOR PRESSES AND THE LIKE

Rudolph W. Glasner and Einar K. Johansen, Chicago, Ill.; said Johansen assignor to said Glasner Application October 27, 1938, Serial No. 237,306

25 Claims. (Cl. 192—144)

This invention relates in general to machines in which there is employed a reciprocating member and in which is provided safety means to lock or prevent the reciprocating member from being set into motion.

Operators are often required to work in the path of movement of the reciprocating member and unless dependable safety means are provided great danger exists that the operator may be injured. The present invention is disclosed in connection with a power press but it is to be understood that it is not necessarily limited to that type of machine.

In the use of power presses or power shears, or similar machines, it is frequently necessary to make adjustments to the dies, or remove the dies and put others in their place while the machine is standing still. Countless accidents resulting in the loss of limb and life of the operator have occurred by the slipping of these reciprocating members after the mechanism was stopped and was apparently out of operation. Usually machines of this kind are operated by means of clutches and stopped by releasing the clutch and applying brakes. Very often fly wheels are employed for supplying energy to reciprocate the parts.

It is apparent that the mere stopping of these parts by the disengagement or disconnection from the original source of power, such for instance as electricity, or the disengagement of the clutch, or the setting of the brake, is not sufficient to insure that the reciprocating parts will be maintained against movement.

One illustration might be the case of a machine which is fly wheel operated and from which the power might have been disconnected and the clutch engaged with the brake set. Should the brake become slightly loosened by vibrations in the brake mechanism, or for any other cause, the reciprocating member might move slightly and slowly at first, so that it is hardly noticed, and will gain momentum rapidly as the movement continues thereby creating a highly dangerous situation for the operator.

In fly wheel operated mechanisms or machines the source of power may be disengaged and the clutch rendered inactive, but still the rotating fly wheel often has sufficient energy stored up to bring the reciprocating members into action.

Machines have previously been provided with safety mechanisms but the safety mechanisms require their being set into operative position by the operator.

To prevent the movement of these reciprocating members under conditions such as described above and under other undesirable conditions, is one of the objects of this invention.

To provide safety mechanism which will operate automatically both in rendering the same active and inactive is another object of the invention.

To provide such safety means which will be visible to the operator is another object of the invention.

Still another object is the elimination of the use of safety blocks which are usually placed in the path of movement of the reciprocating member.

It is a further object of the invention to provide improved means whereby the rotation of the fly wheel may be arrested after the source of driving power has been rendered inactive with respect to the fly wheel.

It is apparent that because of the great variety of types of machines in connection with which such safety mechanism as herein described may be employed, often these safety devices are applied in multiple.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which

In the present exemplification of the invention the press to which this locking mechanism is applied comprises a frame consisting essentially of a bed 20, uprights 21 and a crown 22, here shown as being of a sectional construction, the parts being tied together by tie rods 23 having nuts or collars 24 thereon. Carried by the uprights 21 are guides 25 in which a slide 26 moves and the slide 26 is operated by means of eccentrics 27 through the medium of eccentric straps 28 which latter are pivotally connected as at 29 to an adjustable connection 30, which latter has connection with the slide 26.

If desired, a connecting member 31 may be provided between portions of the eccentric straps 28.

The eccentrics 27 are mounted upon shafts 32 of gears 33 and the shafts are journaled in suitable bearings.

The numeral 34 designates a drive shaft which has secured to it for rotation therewith a gear 35 which gear meshes with a gear 36 to which latter a pinion gear 37 is connected for rotation therewith. The pinion gear 37 meshes with one of the gears 33 and also with another pinion gear 38 which latter meshes with the other gear 33.

When the gear 35 is rotated the gears 33 and the eccentrics 27 will be rotated through the medium of the interconnecting gears which will impart a reciprocatory motion to the slide 26.

Figure 5:
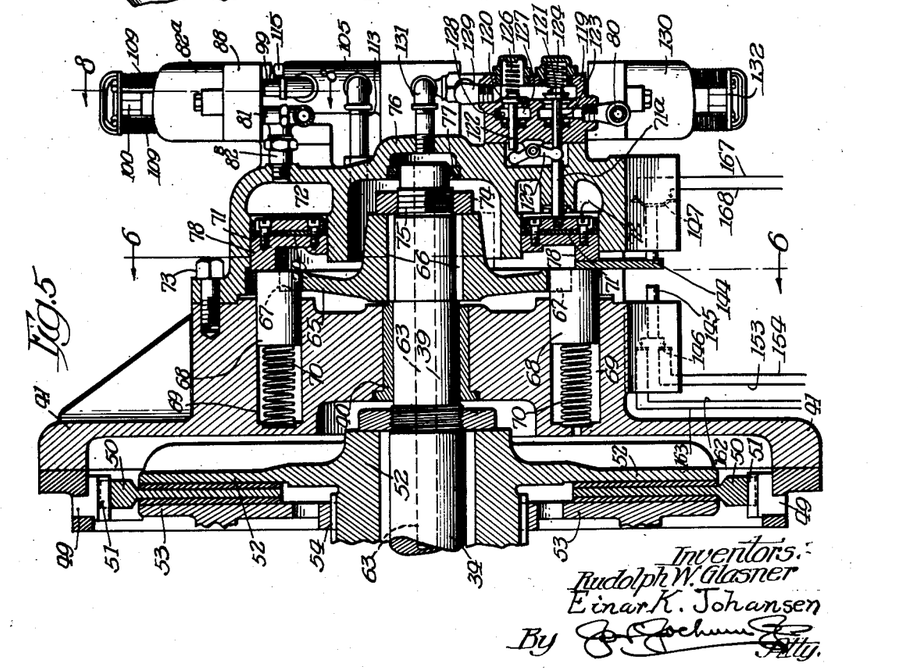
Figure 5 is a detail sectional view, on an enlarged scale, taken on line 5—5 Figure 1.
Figure 6:
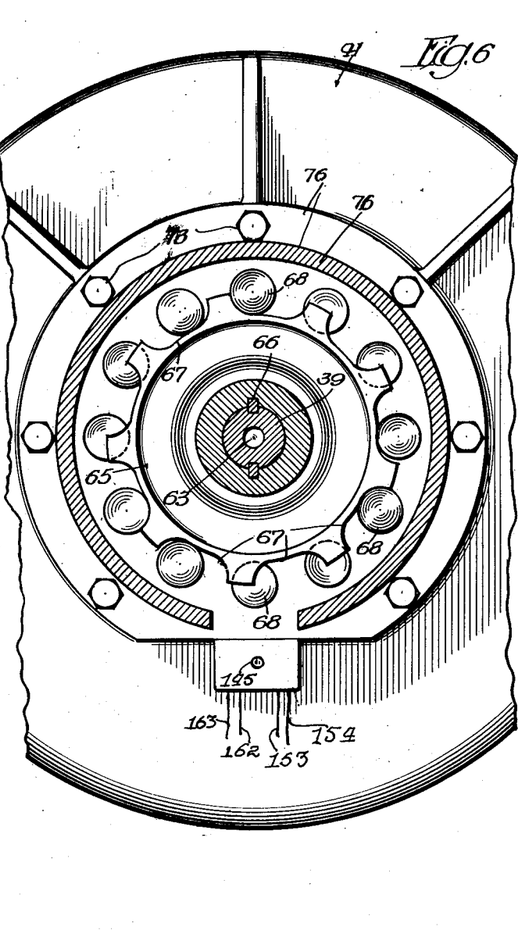
Figure 6 is a sectional view taken on line 6—6 Figure 5, with parts omitted.

The shaft 35 constitutes the main drive shaft of the press and is preferably provided with a reduced extremity 39 that is journaled in a suitable bearing 40 in a stationary part 41 of the machine (see particularly Figure 5).

Figure 1:
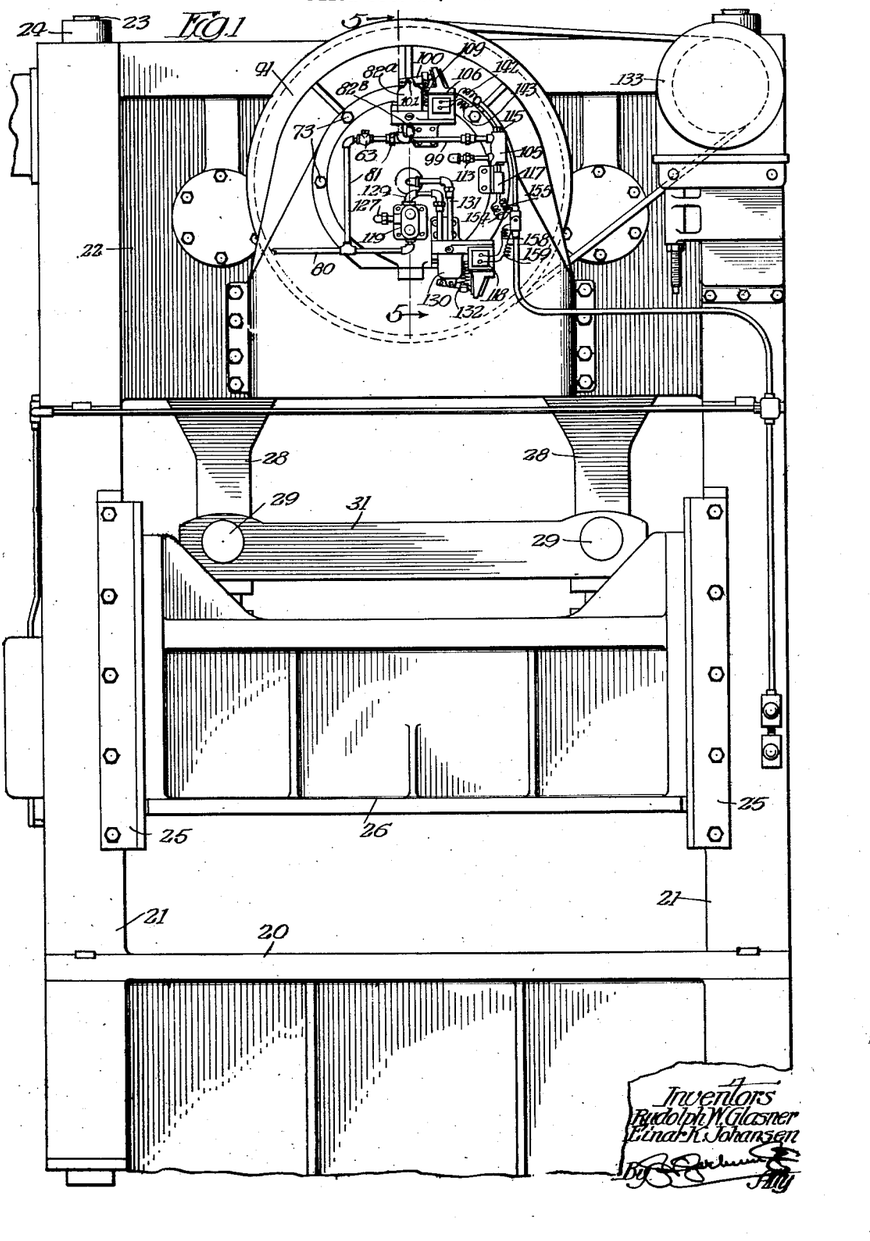
Figure 1 is a front elevation of a power press having mechanism constructed in accordance with the principles of this invention applied thereto.
Figures 2, 3:
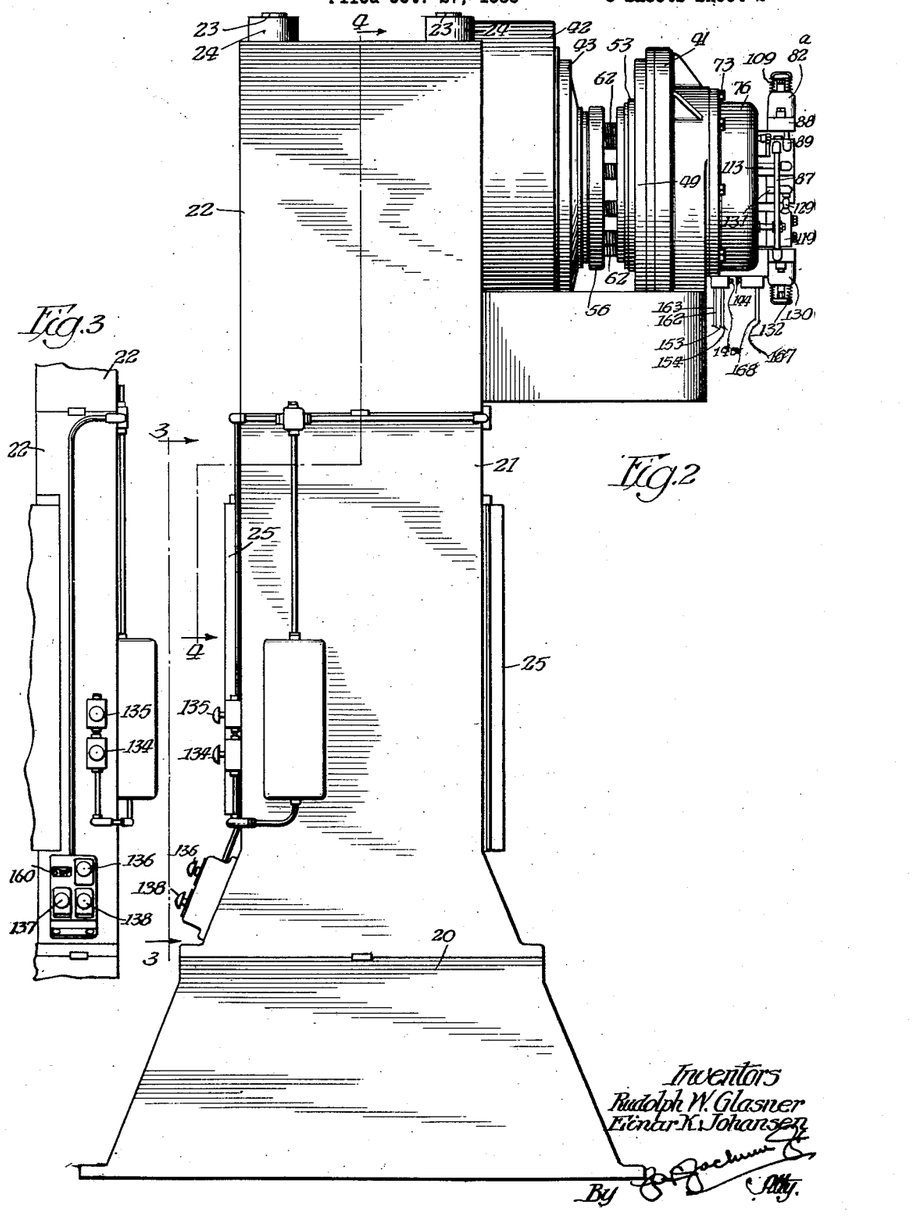
Figure 2 is an end elevation of Figure 1.
Figure 3 is a view in elevation taken on line 3—3 Figure 2.
Figure 4:
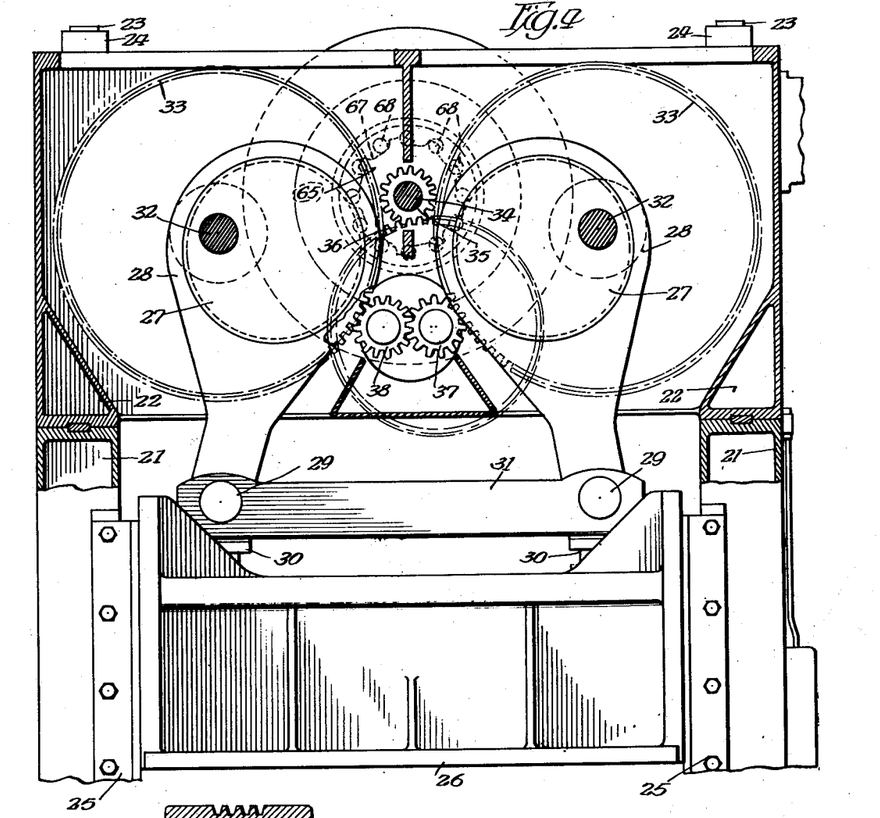
Figure 4 is a detail sectional view taken on line 4—4 Figure 2, with parts omitted.
Figure 4A:
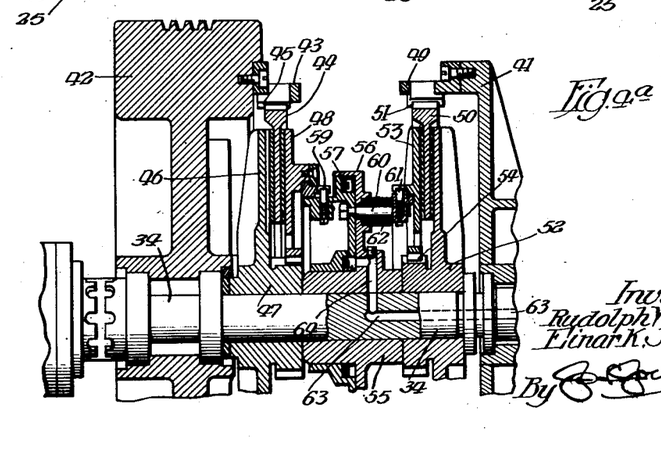
Figure 4A is a detail sectional view of a portion of the clutch and brake mechanism.

The numeral 42 designates a fly wheel which is rotatably supported upon the shaft 34 (see particularly Figure 4A) and carried by the fly wheel is a laterally projecting member 43 which supports a friction lining carrying member 44, the latter being laterally adjustable with respect to the fly wheel, as at 45.

Secured to the shaft 34 for rotation therewith and in proximity to the fly wheel is a clutch member 46, and mounted upon the hub 47 of the clutch member 46 and for lateral movement with respect to the latter, is a co-operating clutch member 48, and the clutch members 46—48 are adapted to grip the lining carrying element 44 which is disposed therebetween, to lock the fly wheel 42 for rotation with the shaft 34.

Carried by the stationary part 41 of the machine is an annular element 49 for supporting a brake lining carrying element 50, the two being connected by intermeshing teeth adapting the element 50 for a slight lateral movement.

Secured also to the shaft 34 for rotation therewith is a brake member 52 disposed on one side of the element 50 and a co-operating brake element 53 is supported by the hub of the brake member 52 for lateral adjustment, as at 54, and this brake member 53 is disposed on the side of the lining carrying element 50 opposite to the side on which the brake member 52 is disposed.

Carried by a member 55 which is also secured to the shaft 34 for rotation therewith between the brake and clutch is a cylinder 56 having a piston therein 57, which is adjustably connected as at 59 with the clutch member 48.

The piston 57 is adjustably connected by means of bars or rods 60, as at 61, with the brake member 53, and springs 62 encompass the bars 60 one end of which spring abuts the cylinder 56 and the other end abuts the brake member 52.

With this construction, the springs 62 tend normally to render the brake members 52—53 active with respect to the element 50, the latter being held against rotation with respect to the stationary portion 41 of the machine so as to arrest the rotation of the shaft 34. When the spring 62 renders the brake active the clutch elements 46—48 are inactive as the piston 57 will be moved inwardly in the cylinder 56.

When fluid pressure is admitted into a passage 63 in the shaft 34 to be discharged through a passage 64 into the cylinder 56, in a manner to be hereinafter described, and from a suitable source, the piston 57 will be moved forwardly in the cylinder against the stress of the springs 62 and the clutch elements 46—48 will be rendered active to grip the lining carrying element 44 and thereby lock the fly wheel 42 for rotation with the shaft 34.

This movement of the piston 57 will cause the brake elements 52—53 to be rendered inactive with respect to the element 50 by withdrawing the element 53 so that the fly wheel will rotate with the shaft 34.

When, however, the fluid pressure is released in the cylinder 56 the springs 62 will move the piston 57 backwardly and apply the brake and release the clutch.

In order to arrest the rotation of the shaft 34 so as to prevent its rotation under the influence of the momentum of the parts should the brake become slightly loosened by vibrations and for other reasons and to insure that the reciprocating member or slide will not move slightly at first and gain momentum as the movement continues, which would create a dangerous condition for the operator, there is provided a positive locking means which consists preferably of a member 65 that is fastened to the shaft 34 in any suitable manner, such as by means of keys 66, and this member 65 may be in the form of a disc or of any other suitable configuration provided with a plurality of open seats or recesses 67 in its periphery.

Mounted in the stationary part 41 of the frame are a series of locking pins 68 which are seated in the recesses 69 and are normally urged forwardly by springs so as to project beyond the frame 41 to be seated in the recesses 67 in the member 65.

Any number of locking pins may be provided and the recesses 67 are preferably of a size somewhat greater than the diameter of the pins 68, and it is preferable to provide a greater number of pins than there are recesses 67 so as to insure the seating of a plurality of pins in a plurality of recesses in any position of the member 65 with respect to the pins 68.

In the present exemplification of the invention three more pins are employed than there are recesses 67. By reason of the length or the size of the recesses and of the position and number of the pins 68, it will be manifest that in any position that the member 65 will assume with respect to the pins, at least three of the pins will be seated in the recesses.

It will therefore be manifest that when the locking pins 68 are seated in these recesses the shaft 34—39 will be maintained against rotation. By reason of the number of recesses and pins such locking will be effected substantially instantaneously when the locking pins are projected.

The pins 68 are moved against the stress of the spring 70 by means of a piston 71 which is seated or operates in a cylinder 72, the latter being supported in any suitable manner such as by means of fastening bolts 73, upon the stationary portion 41 of the frame of the machine. This cylinder 72 together with the piston 71 is of annular configuration so as to encompass the reduced end 39 of the shaft 34 and also the nut 74 which is threaded, as at 75, upon the end of the shaft 34 to maintain the member 65 against lateral movement upon the shaft.

The member 76 in which the cylinder 72 is arranged may also be provided with a bearing 77 for one end of the reduced portion 39 of the shaft 34.

The piston 71 is provided with a lateral projecting annular flange 78 of a thickness less than the diameter of the ends of the pins 68 and also of a size that when the piston 71 is moved forwardly so as to force the pins 68 backwardly against the stress of the springs 70 and out of the seats 67 in the member 65 it will pass over or encompass the periphery of the member 65.

Suitable packing 79 is provided for the piston.

When the fluid pressure in the cylinder 72 is reduced the pressure of the springs 70 upon the pins 68 and which pins engage the flange 78 of the piston 71, will force the piston 71 backwardly in the cylinder and this will permit certain of the pins 68 to be seated in certain of the recesses 67 and thereby lock the shaft 34 against rotation.

Figure 7:
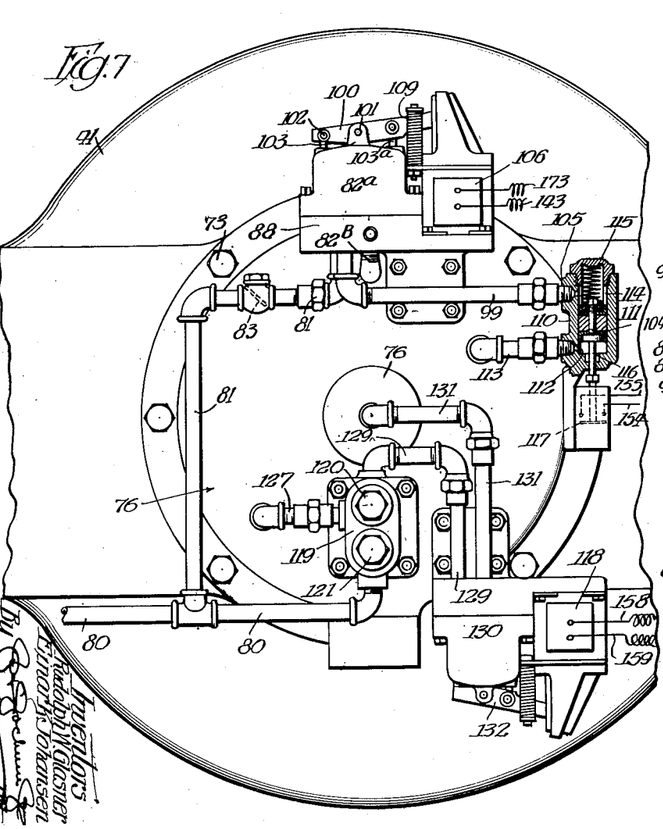
Figure 7 is a front elevation of Figure 5.

Fluid under pressure is supplied to the cylinder 72 from any suitable source through a supply pipe 80 (see particularly Figures 7 and 8) to which a pipe 81 is connected that has communication with a passage or chamber 96 of a valve housing 82A.

The pipe 81 may be provided with a check valve 83. Within the housing 82A is arranged a valve proper consisting preferably of two cup shaped members 84—85 secured together in any suitable manner such as by means of screw threads, one of which telescopes into the other to form a chamber 86 (see particularly Figure 8). A tubular member 87 is supported uprightly by means of the base 88 of the valve housing 82A and is open at both ends, being provided with a partition 89 intermediate such ends and openings 90—91 on opposite sides of the partition.

The valve element comprising the members 84—85 is sleeved upon this upright member 87 to be moved longitudinally thereof, and within the chamber 86 is arranged a spring 92 which tends normally to hold packing glands 93—94 in position to provide fluid tight joints. The pipe 81 forms communication with a passage 95 which in turn communicates with a passage 96 in the valve housing 82A, which in turn has communication, by means of a passage 97, with the upper portion of the tubular member 87.

Leading from the lower portion of the tubular member 87 and on the opposite side of the partition 89 is a passage 98 that has communication with a pipe 99 for a purpose to be described.

The valve element 84—85 is adapted to be raised and lowered upon the tubular member 87 to control the openings 90—91, preferably by means of a lever 100 pivotally mounted intermediate its ends, as at 101. Pivotally connected by one end, and to one end of the lever 100, as at 102, is a bar or member 103 which is provided with a recess 104 to receive a portion of the valve member 84 so that when the lever 100 is rocked about its pivot the valve member will be raised and lowered accordingly.

Figure 8:
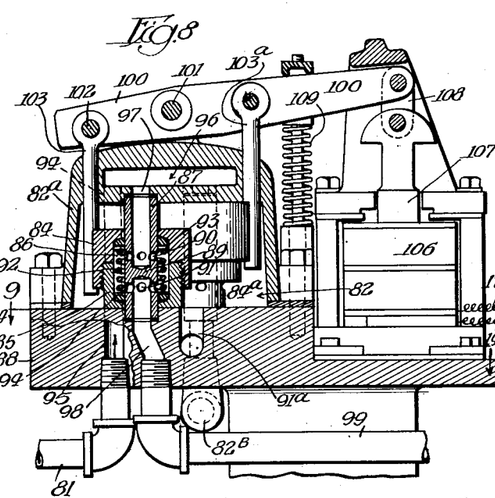
Figure 8 is a detail sectional view on an enlarged scale taken on line 8—8 Figure 5.
Figure 9:
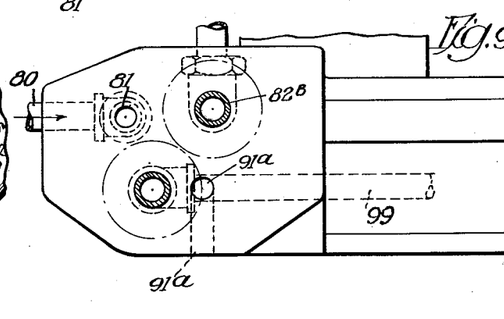
Figure 9 is a detail sectional view taken on line 9—9 Figure 8.

When the valve is in the position shown in Figure 8 fluid entering the pipe 81 and flowing through the passage 95 will enter the chamber or passage 96 to be delivered through the passage 97 into the portion of the tubular member 87 above the partition 89 and will pass out of the openings 90, thence into the chamber 86, through the passages 91 on the other side of the partition 89 of the member 87 to flow through the passage 98 and pipe 99 to a casing 105 of a switch control device.

When, however, the valve 84—85 is raised from the position shown in Figure 8, so as to uncover the ports 91, and to establish communication between the ports 91 and the chamber 82 in the valve housing 82A, the fluid pressure will flow back from the casing 105 of the switch control device, through pipe 99, through passage 98, openings 91, into chamber 82 in the valve housing 82a, thence through opening 91a to the atmosphere.

At the same time a valve 84a similar to the valve 84—85 and which works in opposition to the valve 84—85, will be positioned to establish communication between the passage or chamber 96 and the passage 82b, so that when the valve 84—85 shuts off communication between the pipes 81 and 99, communication between pipes 81 and 82b will be established. The fluid pressure will then flow from pipe 81 through passage 96, through valve 84a, thence to the pipe 82b, to cylinder 72 to shift the pins 68 to unlock the shaft 34.

The valves are raised and lowered preferably by means of an electroresponsive device 106 embodying an armature 107 which is connected by means of a link 108 with the end of the lever 100. One or more springs 109 may be provided which engage and tend normally to move the lever 100 into the position shown in Figure 8. When, however, the electroresponsive device 106 is energized the armature 107 will be lowered, which will in turn rock the lever 100 and through the medium of the bar 103 the valve 84—85 will be raised against the stress of the spring 109, and the valve 84a through the medium of another bar or member 103a will operate in opposition to the valve 84—85.

When the electroresponsive device is deenergized the springs 109 will move the lever 100 in the opposite direction and return the valve 84—85 and the valve 84a to the positions shown in Figure 8.

The switch control device 105 consists essentially of a housing 110 provided with a piston 111, into which housing an opening 112 leads and with which opening a pipe 113 communicates. This pipe 113 in turn has communication with the cylinder 72 in the member 76 for the purpose of controlling the supply of fluid directed through the control device 105.

The piston 111 is loaded by a spring 114 the stress of which may be varied by an adjustable nut or cap member 115, and connected to the stem 116 of the valve 111 is an electrical cutout device 117 for a purpose to be described.

When the fluid pressure through the pipe 113 is sufficient to overcome the stress of the spring 114 the piston 111 will be raised and the electrical cutout device 117 will also be raised closing an electric circuit for a purpose to be described. When, however, the stress of the spring 114 and the pressure of the fluid through the pipe 99 on the top side of the piston 111 overcomes the pressure on the bottom side of the piston 111, the latter will be lowered and the cutout device 117 opened.

When the electroresponsive device 106 is energized to shift the valves 84—85 and 84a from the position shown in Figure 8, air will be exhausted from the top side of the piston 111 in the casing 105 through the pipe 99, through the valve mechanism 84—85, through openings 91 and 91a to the atmosphere.

At the same time air will be admitted through the valve mechanism 84a, to the cylinder or tank 72, through the pipe 113 to the under side of the piston 111 in the casing 105 causing the valve to move in a direction to overcome the stress of the spring 114 to close the switch or cutout device 117 to complete an electrical circuit through another electroresponsive device 118, which latter controls the fluid pressure for the operation of the piston 57 in the cylinder 56 which in turn controls the operation of the clutch and brake device.

At the same time when the piston 71 in the cylinder 72 moves in a direction to force backwardly the locking pins 68 to release or unlock the shaft 34, the supply of fluid pressure to the cylinder 56 in which the piston 57 operates will be controlled by the operation of the valve mechanism arranged within a casing 119 comprising two valves 120—121 (see Fig. 5) which are provided respectively with stems 122—123 and springs 126 and 124 which latter tend normally to seat these valves. These springs are of different tension. When the piston 71 moves forwardly to release the locking pins 68 the spring 124 closes the valve 121, and in so doing the stem 123 will engage one end of a rocker arm 125 to rock the latter, thereby causing the other end of the rocker arm to engage the stem 122 to open the valve 120 against the stress of its seating spring 126.

When, however, the piston is moved backwardly under the stress of the springs 70 and the pins 68 a stem or projection 71A on the piston 71 will engage the rocker arm 125 to cause the latter to engage the stem 122 to open the valve 120 and to move in a direction to permit the spring 124 to close the valve 121.

When the valves are in this position, that is, when the valve 121 is closed and the valve 120 is open, fluid pressure will flow from the cylinder or tank 72 through the pipe 127 (see Figures 5 and 8) through an opening 128, thence through a pipe 129 into the housing of a valve indicated at 130 which latter through the medium of a pipe 131 controls the supply of fluid pressure delivered into the passage 63 through the shaft 34 that communicates with the passage 64 that in turn has communication with the cylinder 56 on the underside of the piston 57.

The construction and operation of the valve mechanism in the casing 130 is the same as that described in connection with the valve device 84—85, and is operated in the same manner by energizing and de-energizing the electroresponsive device 118 which controls the operation or rocking of a lever 132 similar in construction and operation to the lever 100, but in this instance the lever 132 operates only one valve.

When the fluid pressure is admitted into the clutch cylinder 56 the clutch elements 46—48 will be rendered active and the machine will operate so long as these conditions exist.

When it is desired to stop the press or render the clutch device 46—48 inactive, and the brake device 52—53 active, the electroresponsive device 118 is de-energized and the valve in the casing 130 will be shifted to permit the fluid to flow from the clutch controlling cylinder 56 back through the pipe 131 and thence through the valve mechanism in the casing 130 to the atmosphere.

When the motor 133, which drives the machine and which is arranged in the same circuit with the electroresponsive device 106 that controls the valves 84—85 and 84a is stopped, the electroresponsive device 106 will be de-energized, causing the valve 84a to be positioned (as shown in Figure 8) so that the air will flow from the tank or cylinder 72 through the pipe 82b into the exhaust passage 91a to the atmosphere.

The valve 84—85 will then be positioned so that the fluid pressure will flow from pipe 81 into passage 96, member 87, openings 90, chamber 86, openings 91, passage 98, to pipe 99, to casing 105, on the opposite side of the piston 111, forcing down piston, shifting cutout device 117, to open the circuit which is controlled by the said cutout and the said electroresponsive device 118.

The piston in the cylinder 72 will be forced backwardly by the springs 70 and pins 68, and the pins will then enter the openings or seats 67 in the member 65. The shaft 34 will then be locked against rotation and the press will be locked against operation. At the same time that air is exhausted from the cylinder 72 it will also be exhausted from the lower side of the valve 111 through the pipe 113, through the cylinder 72 and the valve mechanism 84—85.

If air pressure should drop sufficiently low, the springs 70 which operate the locking pins 68 will move the piston 71 backwardly in the cylinder 72, and to prevent danger to the locking mechanism the spring 115 in the casing 105 which controls the piston 111 is provided. This spring is weighted to the desired capacity so that in the event of the drop in the pressure it will overcome the existing pressure causing the piston 111 to be actuated to open the switch 117, thereby de-energizing the electroresponsive device 118.

The press cannot then again be operated until a predetermined operating pressure has been re-established in the cylinder 72.

When the press is stopped the fly wheel 42 will then continue to run due to the momentum, and in order to arrest such rotation the clutch elements 46—48 may be employed as the means for stopping the fly wheel. This is accomplished as follows:

The motor 133 being cut off will allow the locking pins 68 to become active and then by energizing the electroresponsive device 118 the valve in the casing 130 will be operated and fluid pressure will flow through the pipe 81 through the valve 120, pipe 129, through the valve in the casing 130, thence through the pipe 131 into the clutch cylinder 56 causing the clutch elements 46—48 to become active. The shaft 34 being now held against rotation, the engagement or the rendering active of the clutch elements 46—48 will cause them to grip the lining carrying element 41 and the motion of the fly wheel will be arrested.

Figure 10:
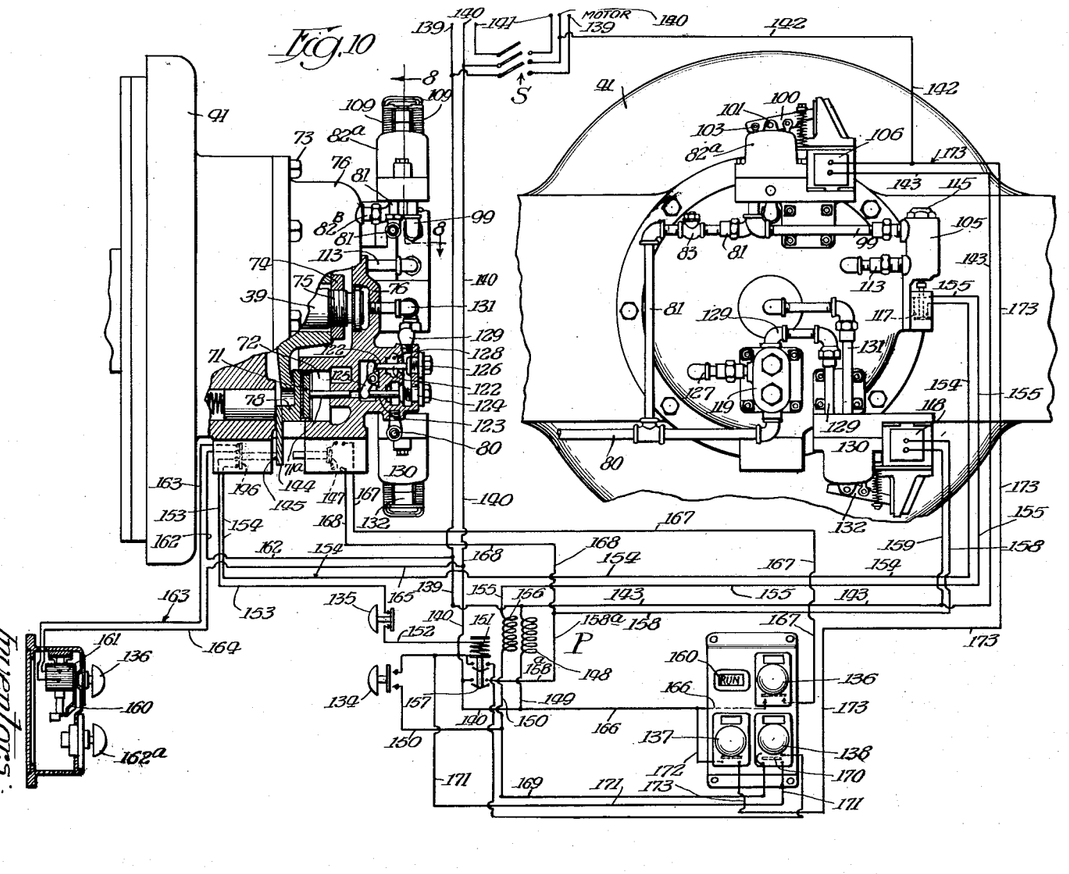
Figure 10 is a view partly in section, partly in elevation, and partly diagrammatic, showing the wiring diagram.

The current for the operation of the various devices will now be described in connection with the wiring diagram shown in Figure 10, in which the numeral 134 indicates the starting button, 135 the stopping button, 136 the fly wheel brake control button, 137 the inching control button, and 138 the inching button.

The electrical current is supplied to the press by means of the conductors 139—140—141, the motor in this instance being a three phase motor. The conductors 139—140—141 lead to the motor through a conventional controller switch designated by the reference letter S which in the diagram is shown open, thus the circuit to the motor and the electroresponsive devices is open. Conductors 139—140 lead to the clutch control panel, the various electroresponsive devices and limit switches.

The electroresponsive device 106 controls the valve in the casing 82a which in turn controls the air to the cylinder or locking control tank 72 and the electroresponsive device 118 controls the valve for the clutch and brake control tank 56. The switch 117 (see Figure 7) is operated from the piston 111 controlled by the air in the cylinder 72 through the pipe 113 and from the valve in the casing 82a through the pipe 99.

This limit switch 117 is provided to brake the clutch control circuit whenever the motor switch S is open or there is a failure in the electric circuit, such for instance as the electroresponsive device 106 having a short circuit or being burnt out, or by the failure of the air in the cylinder or tank 72. If the air pressure falls below a predetermined set pressure this limit switch 117 will open the clutch control circuit, thus de-energizing the electroresponsive device 118 thereby causing the clutch to be disengaged.

This predetermined pressure is set above the air pressure required to act against the piston 71 to maintain the locking pins 68 disengaged from the member 65 or in an unlocking position. The function of the switch 117 is to de-energize the solenoid 118 in the event of the drop in air pressure, and also in the event of any failure of the mechanism or electrical current of the solenoid 106, and the valve in the casing 82a which is controlled thereby.

The circuits for the various electrical mechanisms are as follows, reference being had particularly to Figure 10 of the drawings.

Current is supplied through lines 139—140—141 (the present motor 133 being a three phase motor) to the motor 133, the switch S being closed. Current will also flow from line 140 through the switch S, line 142, through the solenoid 106, thence through conductor 143, to line 139, completing the circuit and energizing the solenoid 106 which controls the valve in the housing 82a. This will admit air to the cylinder 72 forcing the piston 71 in a direction to release the pins 68, thereby unlocking the shaft 34.

At the same time air will also be admitted through the pipe 113 through the opening 112 into the casing 105 forcing the piston 111 upwardly against the stress of the spring 114 to close the switch 117.

When the piston 71 in the cylinder 72 is moved to release the locking pins 68, a contact member 144 (see also Figure 5) moves into engagement with a control member 145 that closes a switch 146. At the same time another switch 147 will be opened. The press is then set for operation.

To start the press the button 134 is actuated and current will flow from the line or conductor 139, through conductor 143, through transformer coils 148, thence through conductor 149, through conductor 140, completing the circuit in the transformer. This transformer is provided so as to reduce the voltage to the push button circuits for safety.

Current from the transformer will flow through line 150, thence back to the starting button 134, which has been closed, through the relay coil 151, through line 152, through stop button 135, line 153, through switch 146, through line 154, thence through switch 117, thence through conductor 155, through transformer coil 156, completing the circuit and energizing relay 151, closing the switch 157.

When switch 157 is closed current will flow from line 140, through switch 157, through line 158a, line 158, through solenoid 118 back through line 159, the line 143, and thence to line 139. This will energize the solenoid 118 operating the valve in the housing 130 admitting air to the cylinder 56, rendering the clutch active and releasing the brake.

The shaft 34 will then rotate to operate the press slide.

When it is desired to stop the press, the button 135 is operated to open the circuit between lines 152 and 153 thereby de-energizing the relay 151, opening the switch 157, opening the circuit between lines 140 and 158, thereby de-energizing the solenoid 118 and operating the valve in the casing 130 to position this valve to close or shut off air supply from the pipe 129 (see particularly Figure 7) and exhausting air from the clutch cylinder 56, allowing the springs 62 to render the brake active.

The control box in which the buttons 136—137—138 are located is also provided with a signal device 160 of any suitable construction but embodies a sign or signal to indicate to the operator whether the press power shaft is locked against rotation, or if it is in an unlocked condition. This sign 160 is operated by an electroresponsive device 161, which receives current from line 139, through line 162, thence through the switch 146, when the latter is closed, through line 163, through solenoid 161, through line 164, line 165, into line 140.

The signal device 160 is so arranged that when the press is set for operation it will so indicate because the pins 68 will be pressed back and the member 144 which is carried with the piston 71 will close the switch 146, allowing the current to flow to solenoid 161 to energize it, and the sign or signal will be set.

When the press is locked against operation the piston 71 will be moved in the opposite direction and with it the member 144 to allow the switch 146 to open and break the circuit through the solenoid 161 to change the signal device 160.

To use the clutch as a fly wheel brake when the shaft is locked against operation, the button 136 is operated and the current will then flow through the line 140 through the line 166, contacts of button 136, through the line 167, switch 147, (which latter is in a closed position when the drive shaft is locked) then through the line 168, through line 158, through solenoid 118, back through line 159 to line 143, and thence back to line 139, completing the circuit.

The solenoid 118 being energized operates its associated valve which is in the casing 130 to admit air to the clutch cylinder 56, thereby rendering the clutch active to grip the lining carrying element 44, the latter being carried with the fly wheel 42 by means of the ring 43, gripping the same and arresting the motion of the fly wheel, as the shaft 34 will at that time be locked by the pins 68 against rotation.

The inching operations are performed as follows:

To inch the press when the driving member is in operation the button 138 is actuated and current will flow from the transformer coil 156, through the line 150, through line 169, through the switch 170 of the button 138, thence through the line 171 into relay 151, through line 152, button 135, line 153, switch 146, line 154, switch 117, line 155, transformer coil 156, completing the circuit and energizing the relay 151 and thereby close the switch 157.

Current in the line 140 flows through the closed switch 157, line 158a, line 158, solenoid 118, line 159, line 143, to line 139, completing the circuit through the solenoid 118 to operate the valve in the casing 130 to admit air into the cylinder 56. The clutch will then engage and the press will operate. Then by vibrating the button 138 an intermediate rotation of the shaft 34 will result.

When the motor is not running the inching is produced as follows. It is first necessary to unlock the shaft 34 which is accomplished as follows: Button 137 is operated and current will then flow from the line 140 through line 166, line 172, through contacts of button 137, line 173 and through solenoid 106, line 143, back to line 139. This will cause the solenoid 106 to become energized to actuate the associated valve in the casing 82a to admit air to the cylinder 72, forcing piston 71 to unlock pins 68. At the same time air will be admitted through pipe 113 on the lower side of the piston 111 in the casing 105, to close the switch 117. Air will also be exhausted at the same time from the top side of the piston 111 in the casing 105. It will then be necessary to hold the button 137 closed to maintain the parts in the above described position.

By then operating button 138 the same operation will be performed as when operating the same button for inching purposes when the motor is operatively connected with the press and the shaft 34 is in an unlocked condition. It will be noted that the piston 71 controls the switches 146—147 through the medium of an element 144 which is attached to the piston 71, and that the element 144 is moved back and forth with the piston, thereby alternately opening and allowing the switches 146—147 to be closed.

Since the controlling buttons are respectively included in the different circuits thus controlled, it will be manifest that when the piston 71 is in a position to allow the locking pins 68 to become active, the circuit of the button 134 will be open so that the operation of this button will at that time have no effect.

At this time the solenoid for the signal device 160 will be de-energized and the signal 160 will be displayed.

Likewise, when the piston 71 is in a position to render the pins 68 inactive, the circuit of the switch 147 will be open rendering the button 136 inactive.

The switch 146 in the circuit of which the button 134 is included, as well as the circuit of the solenoid 161, will be closed.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. In a press, a rotatable shaft, a source of actuating power, mechanism for connecting said shaft to and for disconnecting it from said source of power, means for controlling the said mechanism, positive interlocking means independent of said connecting mechanism for locking the shaft against rotation under predetermined conditions, when it is disconnected from said source of power, and means operating automatically upon stopping the source of power, for disconnecting the shaft from said source of power and for rendering the said interlocking means active.

2. In a press, a rotatable shaft, a source of actuating power, mechanism for connecting said shaft to and for disconnecting it from said source of power, means for controlling the said mechanism, positive interlocking means independent of said connecting means for locking the shaft against rotation under predetermined conditions, when it is disconnected from said source of power, and means operating automatically upon stopping the source of power, for disconnecting the shaft from said source of power and for rendering the said interlocking means active, the last recited means embodying fluid pressure actuated mechanism, a valve device for controlling the fluid pressure and electroresponsive means for controlling said valve device.

3. In a press, a rotatable shaft, a source of actuating power, mechanism for connecting said shaft to and for disconnecting it from said source of power, a brake, means other than said brake for positively locking said shaft against rotation under predetermined conditions, when it is disconnected from said source of power and at a plurality of different points in its cycle of rotation, the said locking means embodying a locking element and abutments with which said element co-operates, said element and abutment being carried one with the said shaft and the other by a stationary part of the press, and means for rendering said locking means active and inactive.

4. In a press, a rotatable shaft, a source of actuating power, mechanism for connecting said shaft to and for disconnecting it from said source of power, a brake, means other than said brake for positively locking said shaft under predetermined conditions, against rotation when it is disconnected from said source of power, the said locking means embodying a locking element and an abutment with which said element co-operates, said element and abutment being carried one with the said shaft and the other by a stationary part of the press, means embodying fluid pressure controlled mechanism for rendering said locking means active and inactive, and means for controlling the said fluid pressure.

5. In a press, a rotatable shaft, a source of actuating power, means for connecting said shaft to and for disconnecting it from said source of power, means for locking said shaft under predetermined conditions, against rotation when it is disconnected from said source of power and at a plurality of different points in its cycle of rotation, the said locking means embodying a locking pin movable in a plane substantially parallel with the axis of said shaft and an element provided with a plurality of recesses to receive said pin, said pin being common to said recesses, means for projecting the pin to cause it to enter said recess, and means for retracting the pin, said pin and said recessed element being carried one by said shaft and the other by a stationary part of the press.

6. In a press a rotatable shaft, a source of actuating power, means for connecting said shaft to and for disconnecting it from said source of power, means for locking said shaft under predetermined conditions, against rotation when it is disconnected from said source of power, the said locking means embodying a locking pin movable in a plane substantially parallel with the axis of said shaft and an element provided with recesses to receive said pin, means for projecting the pin to cause it to enter said recess, means for retracting the pin, said pin and said recessed element being carried one by said shaft and the other by a stationary part of the press, the last recited means embodying a slidable element engageable with the end of the pin, and means for supplying fluid pressure to operate the last said means.

7. In a press a rotatable shaft, a source of actuating power for the shaft, means embodying a clutch device for connecting the shaft to and for disconnecting the shaft from said source of power, brake mechanism, locking means other than said brake mechanism for locking the shaft against rotation under predetermined conditions, when it is disconnected from the said source of power, the last said means embodying a fluid pressure operated element, electroresponsive means for controlling the operation of said element, means for controlling the operation of said electroresponsive device, means for supplying fluid pressure to actuate said clutch device, and means responsive to the operation of the said element for controlling the actuation of the said clutch device.

8. In a press a rotatab'e shaft, a source of actuating power for the shaft, means embodying a clutch device for connecting the shaft to and for disconnecting the shaft from said source of power, brake mechanism, locking means other than said brake mechanism for locking the shaft against rotation under predetermined conditions, when it is disconnected from the said source of power, the last said means embodying a fluid pressure operated element, electroresponsive means for controlling the operation of said element, means for controlling the operation of said electroresponsive device, means for supplying fluid pressure to actuate said clutch device, and means responsive to the operation of the said element for controlling the actuation of the said clutch device, the last recited means embodying a valve device, electroresponsive means for actuating the valve, and a fluid pressure controlled switch device for controlling the operation of the said switch device.

9. In a press, a driven shaft, a rotatable driving element, means embodying a clutch device for connecting said shaft with said driving element for rotation therewith, said means also operating to disconnect the shaft from said element whereby the element will rotate freely with respect to the shaft, means for controlling the operation of said clutch, locking means for locking the shaft against rotation under predetermined conditions, when it is disconnected from said driving element, and means for arresting the rotation of said element when the said shaft is disconnected therefrom.

10. In a press, a driven shaft, a rotatable driving element, means embodying a clutch device for connecting said shaft with said driving element for rotation therewith, said means also operating to disconnect the shaft from said element whereby the element will rotate freely with respect to the shaft, means for controlling the operation of said clutch, locking means for locking the shaft against rotation under predetermined conditions, when it is disconnected from said driving element, and means for rendering the said clutch device active to arrest the rotation of said element when the shaft is disconnected from the element and is itself locked against rotation.

11. In a press, a driven shaft, a rotatable driving element, a clutch device between the shaft and said element, said element rotating freely when the shaft is disconnected therefrom, fluid pressure controlled means for actuating the clutch device, means for locking the shaft against rotation under predetermined conditions, when it is disconnected from said element, and means for causing the said fluid pressure controlled means to render the clutch device active to arrest the free rotation of said element when the shaft is disconnected therefrom and is itself locked against rotation.

12. In a press, a driven shaft, a rotatable driving element, a clutch device between the shaft and said element, said element rotating freely when the shaft is disconnected therefrom, fluid pressure controlled means for actuating the clutch device, means for locking the shaft against rotation under predetermined conditions, when it is disconnected from said element, means for causing the said fluid pressure controlled means to render the clutch device active to arrest the free rotation of said element when the shaft is disconnected therefrom and is itself locked against rotation, the third recited means embodying a valve device, electroresponsive means for actuating the valve device, and means for controlling the said electroresponsive device.

13. In a press, a driving element, a driven shaft, a source of power connected with said element, a clutch between said element and said shaft, brake mechanism, means other than said brake mechanism for positively locking the shaft against rotation under predetermined conditions, when it is disconnected from the driving element, fluid pressure actuated means for controlling the clutch, means embodying a valve device for controlling the supply of fluid pressure, electroresponsive means for controlling said valve, means for controlling said electroresponsive device to actuate the clutch device, fluid pressure controlled means for rendering said locking means active and inactive, and means for controlling the last recited electroresponsive means, whereby the said shaft may be given intermittent steps of rotation.

14. In a press, a driving element, a driven shaft, a source of power connected with said element, a clutch between said element and said shaft, means for positively locking the shaft against rotation under predetermined conditions, when it is disconnected from the driving element, fluid pressure actuated means for controlling the clutch, means embodying a valve device for controlling the supply of fluid pressure, electroresponsive means for controlling said valve, means for controlling said electroresponsive device to actuate the clutch device, fluid pressure controlled means for rendering said locking means active and inactive, means for controlling the last recited electroresponsive means, whereby the said shaft may be given intermittent steps of rotation, a signal device, and means controlled by the actuation of the lock controlling means, for setting said signal device for subsequent operation by the actuation of the said locking means.

15. In a press, a driving element, a driven element, a clutch for connecting and disconnecting the said elements, fluid pressure controlled means for controlling said clutch, means for controlling the supply of fluid pressure, brake mechanism locking means other than said brake mechanism for locking the driven element against rotation under predetermined conditions, when it is disconnected from said driving element, fluid pressure controlled means for controlling the operation of said locking means, means for controlling the operation of the last said fluid pressure controlled means and embodying a valve device and an electroresponsive device for controlling the valve, and means embodying a fluid pressure controlled switch device for controlling the operation of the last said electroresponsive device and operable by a variation of the fluid pressure.

16. In a press, a driving element, a driven element, a clutch for connecting and disconnecting the said elements, fluid pressure controlled means for controlling said clutch, means for controlling the supply of fluid pressure, brake mechanism, locking means other than said brake mechanism for locking the driven element against rotation under predetermined conditions, when it is disconnected from said driving element, fluid pressure controlled means for controlling the operation of said locking means, means for controlling the operation of the last said fluid pressure controlled means and embodying a valve device and an electroresponsive device for controlling the valve, means embodying a fluid pressure controlled switch device for controlling the operation of the last said electroresponsive device and operable by a variation of the fluid pressure, a source of power for said driving element embodying a motor, an electric circuit for the motor, and means for controlling the circuit, the electroresponsive device for controlling the operation of the said locking means being included in the motor circuit.

17. In a press, a driven shaft, a driving element, a clutch for connecting and disconnecting said shaft and element, fluid pressure controlled means for actuating the clutch, brake mechanism, locking means other than said brake mechanism for locking the shaft against rotation under predetermined conditions, when it is disconnected from said driving element, a shiftable element for rendering the locking means inactive, means for supplying fluid pressure to the last said element, and means controlled by the operation of the last said element for controlling the supply of fluid pressure to the clutch device.

18. In a press, a driven shaft, a driving element, a clutch for connecting and disconnecting said shaft and element, fluid pressure controlled means for actuating the clutch, brake mechanism, locking means other than said brake mechanism for locking the shaft against rotation under predetermined conditions, when it is disconnected from said driving element, a shiftable element for rendering the locking means inactive, means for supplying fluid pressure to the last said element, means controlled by the operation of the last said element for controlling the supply of fluid pressure to the clutch device, the clutch actuating means embodying a valve device, and an electroresponsive device for controlling the valve.

19. In a press, a rotatable shaft, a rotating driving element, a clutch for connecting the shaft and element, means for controlling the clutch, locking means for locking the shaft against rotation under predetermined conditions, when it is disconnected from the driving element, said locking means embodying a member connected to the shaft and of a diameter considerably greater than the diameter of the shaft, there being recesses in said member encompassing the shaft, locking pins carried by a stationary part of the press and encompassing the shaft, means for seating the pins in said recesses, and means for unseating the pins, the number of pins exceeding the number of said recesses, said recesses being of a length substantially greater than the diameter of the pins.

20. In a press, a rotatable shaft, a rotating driving element, a clutch for connecting the shaft and element, means for controlling the clutch, locking means for locking the shaft against rotation under predetermined conditions, when it is disconnected from the driving element, said locking means embodying a member connected to the shaft and of a diameter considerably greater than the diameter of the shaft, there being recesses in said member encompassing the shaft, locking pins carried by a stationary part of the press and encompassing the shaft, means for seating the pins in said recesses, means for unseating the pins, the number of pins exceeding the number of said recesses, said recesses being of a length substantially greater than the diameter of the pins, the said means for unseating the pins embodying a member provided with an annular portion of an internal diameter greater than the diameter of the said recessed member and adapted to pass over the last said member to engage a portion of the ends of the pins for moving them, means for supplying fluid pressure to the pin unseating member, and means for controlling said fluid pressure.

21. In a press, a rotatable shaft, a driving element, clutch mechanism for connecting the shaft and the driving element, brake mechanism, locking means other than said brake mechanism for locking the shaft against rotation under predetermined conditions, when it is disconnected from said driving element, fluid pressure actuated means individual to the clutch and locking means for actuating them, means embodying electroresponsive devices individual to the fluid actuated means for controlling the operation of the latter, means for controlling one of said electroresponsive devices, and means rendered operable upon the actuation of the last recited electroresponsive device for controlling the operation of the other of said electroresponsive devices.

22. In a press, a rotatable shaft, a driving element, clutch mechanism for connecting the shaft and the driving element, brake mechanism, locking means other than said brake mechanism for locking the shaft against rotation under predetermined conditions, when it is disconnected from said driving element, fluid pressure actuated means individual to the clutch and locking means for actuating them, means embodying electroresponsive devices individual to the fluid actuated means for controlling the operation of the latter, means for controlling one of said electroresponsive devices, means rendered operable upon the actuation of the last recited electroresponsive device for controlling the operation of the other of said electroresponsive devices, additional control means for one of said electroresponsive devices, means responsive to the operation of the last said electroresponsive device for conditioning the other electroresponsive device to be subsequently operated, and means for causing such subsequent operation.

23. In a press, a rotatable shaft, a separate source of supply of actuating power, mechanism for connecting the shaft with said source of power, means for locking the shaft against rotation under predetermined conditions, when it is disconnected from said source of power and at a plurality of points in its cycle of rotation, the said locking means embodying a locking element and abutments with which said element co-operates, said element and said abutments being carried one by a stationary part of the press and the other with said shaft, and means for rendering said locking means active and inactive.

24. In a press, a rotatable shaft, a separate rotatable driving element, means for connecting the shaft with the said element to be rotated thereby, means for locking the shaft against rotation under predetermined conditions, when it is disconected from said element, means operating to render the said connecting means inactive while the said shaft is locked against rotation, and means whereby the rotation of the said element will be arrested while the said shaft is thus locked against rotation.

25. In a press, a rotatable shaft, a separate rotatable driving element, means for connecting the shaft with the said element to be rotated thereby, brake mechanism, means other than said brake mechanism for locking the shaft against rotation under predetermined conditions, when it is disconnected from said element, means operating to render the said connecting means inactive while the said shaft is locked against rotation, and means whereby the said connecting means may be caused to operate as a brake or stop mechanism for stopping the rotation of said driving element when the said shaft is locked against rotation.

EINAR K. JOHANSEN.
RUDOLPH W. GLASNER.